US012715159B2

(12) United States Patent
Stuckey et al.

(10) Patent No.: US 12,715,159 B2
(45) Date of Patent: Aug. 25, 2026

(54) MOULDING APPARATUS

(71) Applicant: JEMMTEC LIMITED, Earlsheaton (GB)

(72) Inventors: Mark Stuckey, Earlsheaton (GB); Christopher Webster, Earlsheaton (GB)

(73) Assignee: JEMMTEC LIMITED, Earlsheaton (GB)

( * ) Notice: Subject to any disclaimer, the term of this patent is extended or adjusted under 35 U.S.C. 154(b) by 92 days.

(21) Appl. No.: 18/561,230

(22) PCT Filed: May 17, 2022

(86) PCT No.: PCT/GB2022/051229
§ 371 (c)(1),
(2) Date: Nov. 15, 2023

(87) PCT Pub. No.: WO2022/243663
PCT Pub. Date: Nov. 24, 2022

(65) Prior Publication Data

US 2024/0227236 A1 Jul. 11, 2024

(30) Foreign Application Priority Data

May 17, 2021 (GB) ..................................... 2107027

(51) Int. Cl.
*B28B 5/04* (2006.01)
*B28B 1/26* (2006.01)

(52) U.S. Cl.
CPC .................. *B28B 5/04* (2013.01); *B28B 1/26* (2013.01); *B28B 2005/048* (2013.01)

(58) Field of Classification Search
None
See application file for complete search history.

(56) References Cited

U.S. PATENT DOCUMENTS 3,233,018 A * 2/1966 Ripley ...................... B28B 5/04 264/69
3,789,102 A * 1/1974 Hazelett, Jr. .............. B28B 5/04 264/295

(Continued)

FOREIGN PATENT DOCUMENTS

GB 2518856 A 4/2015
JP H0752115 A 2/1995

(Continued)

OTHER PUBLICATIONS

Great Britain Search Report (GBSR) for GB 2107027.1 mailed Feb. 22, 2022 (3 pages).

(Continued)

*Primary Examiner* — Jacob T Minskey
*Assistant Examiner* — Adrien J Bernard
(74) *Attorney, Agent, or Firm* — Shumaker, Loop & Kendrick LLP

(57) ABSTRACT

An apparatus for delivering a mould including a first and a second part into a dosing position. The apparatus includes a reorientation conveyor portion comprising first and second opposed retainer members. At least one of the first and second retainer members includes a conveyor. The first and second retainer members are operable to form a separation therebetween and the reorientation conveyor portion is operable to receive the mould into the separation between the first and second retainer members with the first and second retainer members in a first orientation and then move the first and second retainer members into a second orientation while substantially maintaining the first part of the mould in the same position relative to the second part of the mould. The apparatus further includes a mould-separation portion. The reorientation conveyor portion is operable to at least partially eject the mould into the mould-separation portion when the first and second retainer members are in the second (Continued)

orientation. The mould-separation portion is operable to actuate at least partial separation of the first and second parts of the mould.

28 Claims, 3 Drawing Sheets

(56) References Cited

U.S. PATENT DOCUMENTS

| | | | | | |
|---|---|---|---|---|---|
| 4,200,604 | A * | 4/1980 | Dziedzic | B28B 1/26 264/101 |
| 5,385,701 | A * | 1/1995 | Awazu | B28B 1/26 264/86 |
| 2004/0099160 | A1* | 5/2004 | Tweedy | B41F 15/0872 101/41 |
| 2010/0136156 | A1* | 6/2010 | Bergling | B28B 15/005 425/453 |

FOREIGN PATENT DOCUMENTS

| | | | |
|---|---|---|---|
| NL | 81315 | C | 11/1955 |
| RU | 2668901 | C1 | 10/2018 |
| WO | 2021099787 | A1 | 5/2021 |

OTHER PUBLICATIONS

Hiwin Motion Control and System Technology, “LAA Series Servo Actuator” dated 2018 (6 pages).
Orientalmotor, “Brushless Motors BLE2 Series All New. An advanced Brushless DC package, which is both easy to use and feature rich.”, UK_Catalogue dated Apr. 14, 2021 (32 pages).
MTS Series Linear Actuator, “MTS Series Internally and Externally Guided Belt Driven Actuator” p. 24-31, dated May 6, 2021.
International Search Report (ISR) for PCT/GB2022/051229 mailed Aug. 1, 2022 ( 4 pages).
Written Opinion for PCT/GB2022/051229 mailed Aug. 1, 2022 (7 pages).
Office Action Issued on Sep. 29, 2025 In Russian App No. 2023131176/03 (6 Pages) Provided Herein Per MPEP 609.04(a)III.

* cited by examiner

MOULDING APPARATUS

FIELD

The present invention relates to moulding apparatus for delivering a mould into a dosing position for use in the manufacture of packing members for packed beds. More specifically, the present invention relates to apparatus for delivering a multi-part mould into a dosing position for use in the manufacture of ceramic catalyst supports and supported catalysts for use in processes such as the steam reforming and the production of direct-reduced iron.

BACKGROUND

Metal catalysts used in industrial processes such as steam reforming and the production of direct-reduced iron are more active if finely divided into small particles to increase the metal surface area. A large metal surface area can be maintained during such reactions by spreading the metal particles across a refractory support. Another advantage of the use of catalyst supports in such processes is that only a small amount of the more expensive catalytic metals is required for dispersion onto a large amount of abundant inexpensive support materials, thereby considerably reducing the cost of catalytic materials required at commercial scale.

Supports for catalysts in such industrial processes are typically made by extrusion, pelleting or granulation of ceramic powder followed by calcination of the green body.

However, it has been found that such methods can only offer restricted support geometry and physical properties. For example, such supports may achieve high strength, but only at the expense of low geometric surface area and poor porosity. The process of forming supports for catalysts can also be time consuming and expensive Therefore, there is a requirement for improved supports for catalysts having a better combination of desirable properties that are able to be produced economically.

Therefore, there is need for processes which can form supports for catalysts economically, which save time and money, and which can be automated. It is therefore an object of aspects of the present invention to address one or more of the abovementioned or other problems.

SUMMARY

According to a first aspect of the present invention there is provided an apparatus for delivering a mould comprising a first and a second part into a dosing position, the apparatus comprising: a reorientation conveyor portion comprising first and second opposed retainer members, wherein at least one of the first and second retainer members comprises a conveyor, and wherein the first and second retainer members are operable to form a separation therebetween, and wherein the reorientation conveyor portion is operable to receive the mould into the separation between the first and second retainer members with the first and second retainer members in a first orientation and then move the first and second retainer members into a second orientation while substantially maintaining the first part of the mould in the same position relative to the second part of the mould; the apparatus further comprising a mould-separation portion, wherein the reorientation conveyor portion is operable to at least partially eject the mould into the mould-separation portion when the first and second retainer members are in the second orientation, and wherein the mould-separation portion is operable to actuate at least partial separation of the first and second parts of the mould.

According to a second aspect of the present invention there is provided a method of dosing a mould comprising a first and a second part using an apparatus according to the first aspect, comprising the steps of:

(a) arranging the mould into the separation between the first and second retainer members with the first and second retainer member in a first orientation;

(b) moving the first and second retainer members into a second orientation while substantially maintaining the first part of the mould in the same position relative to the second part of the mould;

(c) at least partially ejecting the mould into a mould-separation portion so that at least partial separation of the first and second parts of the mould occurs; and (d) dosing the mould with a moulding composition.

The method may further comprise the step of (e) the first and second retainer members repossessing the mould so that at least partial re-closure of the first and second parts of the mould occurs.

The method may further comprise the step of (f) moving the first and second retainer members back into the first orientation or into a third orientation while substantially maintaining the first part of the mould in the same position relative to the second part of the mould.

The method may further comprise the step of (g) curing the moulding composition in the mould, such as to form a green body.

The use of "dosing position" herein refers to the mould being in an at least partially open position in which a portion of the first and second mould parts are spaced, which, in this open position, the mould is operable to receive a portion of a moulding composition from a dosing member, such as a dosing member arranged above the mould. The dosing position may be a substantially vertical dosing position. In the dosing position at least a portion of the first and second mould parts may be abutting.

The apparatus may further comprise a biasing member operable to bias the separation between the first and second opposed retainer members to a first distance. The separation between the first and second opposed retainer members may be operable to be moved to a second distance that is larger than the first distance with the application of a separating force. The first distance may be smaller than the thickness of the mould. The thicker mould may therefore provide the separating force, enabling the biasing member to apply a holding force to the mould and the separation distance attempts to revert to the first distance.

The biasing member may be operable to apply sufficient force to substantially maintain the first part of the mould in the same position relative to the second part of the mould during movement of the first and second opposed retainer members from the first orientation to the second orientation.

The biasing member may be sprung-loaded. The biasing member may comprise at least 2 sprung-loaded support bars, such as at least 3 or at least 4. The biasing member may be operable to support the second retainer member at the first distance from the first retainer member when the first retainer member is arranged above the second retainer member such that the second retainer member is suspended from the first retainer member.

The apparatus may further comprise a dosing member. The dosing member may be operable to dispense a moulding composition into the mould, suitably a liquid ceramic composition. The dosing member may be operable to move laterally above the mould. Advantageously, this may provide a more even filling of the mould. The dosing member may comprise a reciprocating feeding nozzle. The dosing member may be belt driven.

The apparatus may further comprise an infeed conveyor portion. The infeed conveyor portion may be operable to feed the mould into the reorientation conveyor portion. The infeed conveyor portion may comprise a conveyor belt. The infeed conveyor portion may further comprise a runner member along one or both sides of the conveyor which restrict the lateral movement of the mould. The infeed conveyor portion may be arranged on a support such that the ejection portion of the infeed conveyor portion is aligned with the reorientation conveyor portion such that the mould may be passed into the separation between the first and second retainer members.

The infeed conveyor portion and the reorientation conveyor portion may be operable to pass the mould into the separation between the first and second retainer members from the infeed conveyor portion at a speed of at least about 3500 mm/min, typically at least about 4000 mm/min, more typically, at least about 4500 mm/min. The infeed conveyor portion and the reorientation conveyor portion may be operable to pass the mould into the separation between the first and second retainer members from the infeed conveyor portion at a speed of less than 6500 mm/min, typically less than about 6000 mm/min, more typically, less than about 5500 mm/min. The infeed conveyor portion and the reorientation conveyor portion may be operable to pass the mould into the separation between the first and second retainer members from the infeed conveyor portion at a speed of between about 3500 to 6500 mm/min, typically between about 4000 to 6000 mm/min, more typically, between about 4500 to 5500 mm/min.

The apparatus may further comprise an outfeed conveyor portion operable to accept the mould that is ejected from the reorientation conveyor portion. The outfeed conveyor portion may comprise first and second opposed retainer portions wherein the opposed retainer portions are operable to form a separation therebetween. The opposed retainer portions may be arranged such that the first retainer portion is located above the second retainer portion. The first retainer portion, such as comprising a compression roller, may be operable to substantially maintain the first part of the mould in the same position relative to the second part of the mould as the mould moves along the outfeed conveyor portion. The second retainer portion may comprise a conveyor belt. The conveyor belt may comprise a high-grip belt. The high-grip belt may comprise grooves.

The reorientation conveyor portion and the outfeed conveyor portion may be operable to pass the mould from the reorientation conveyor portion to the outfeed conveyor portion at a speed of at least 3000 mm/min, typically, at least 3500 mm/min, more typically, at least 4000 mm/min. The reorientation conveyor portion and the outfeed conveyor portion may be operable to pass the mould from the reorientation conveyor portion to the outfeed conveyor portion at a speed of less than 6000 mm/min, typically, less than 5500 mm/min, more typically, less than 5000 mm/min. The reorientation conveyor portion and the outfeed conveyor portion may be operable to pass the mould from the reorientation conveyor portion to the outfeed conveyor portion at a speed of about 3000 to 6000 mm/min, typically, at a speed of about 3500 to 5500 mm/min, more typically, about 4000 to 5000 mm/min.

The conveyor of the reorientation conveyor portion, the first retainer member, the second retainer member, the infeed conveyor and/or the outfeed conveyor may comprise a driven conveyor. When the first and second retainer members both comprise a conveyor, both conveyors may be driven conveyors.

The conveyor of the reorientation conveyor portion, the first retainer member, the second retainer member, infeed conveyor portion and/or outfeed conveyor portion may be driven using motors and gear heads. The motor may comprise a speed control range of from 80-4000 r/min. The motor may comprise a speed regulation rate of +0.2%. The motor speed may be from about 2000 to 4000 r/min, typically from about 2500 to about 3500 r/min, more typically, from about 2800 to about 3200 r/min.

The motor and gear heads may be operable to substantially maintain the required level of torque through the speed range. Advantageously, this allows easy movement of the mould through the apparatus, allowing the required speeds to be achieved. The rated torque may be from about 0.16 to about 0.22 newton-metre (Nm), typically, from about 0.17 to about 0.21 Nm, more typically, from about 0.18 to 0.20 Nm.

Advantageously, the combination of the compression that is generated by the biasing member with the abovementioned torque may provide further improved control of the mould during reorientation and dosing of the mould.

The reorientation conveyor portion may be operable to receive the mould in a first orientation and move into a second orientation to eject the mould at least partially into the mould-separation portion. The angle between a major axis of the reorientation conveyor portion, such as the axis of the reorientation conveyor portion along the direction of conveyance of the mould, typically the longitudinal axis of the reorientation conveyor portion, in the first and second orientations may be from 30 to 90°, such as from 50 to 90°, or from 70 to 90°, such as substantially 90°. The movement of the reorientation conveyor portion may be from a substantially horizontal orientation (first orientation) to the substantially vertical orientation (second orientation). The reorientation conveyor portion may be operable to return the mould to the first orientation.

The reorientation conveyor portion may be operable to be rotated by at least 80° from a substantially horizontal orientation, such as by at least 85° from a substantially horizontal orientation. Typically, the reorientation conveyor portion may be operable to be rotated by less than 120° from a substantially horizontal orientation.

The reorientation conveyor portion may be operable to rotate about its lateral axis. The reorientation conveyor portion may comprise a pivot point about which the reorientation conveyor portion is operable to rotate. The pivot point may be offset. The pivot point may be offset such that the pivot point is arranged along the reorientation conveyor portion spaced from an end thereof. The reorientation conveyor portion may comprise a pivot shaft at the pivot point and/or be operable to receive a pivot shaft that may be member operable to be coupled to an actuation member. The reorientation conveyor portion may comprise first and second pivot attachment members arranged at opposed sides of the reorientation conveyor portion that are operable to receive a pivot shaft.

The apparatus may further comprise an actuation member that is operable to cause rotation of the reorientation conveyor portion. The actuation member may be operable to actuate rotation of the first and second retainer members around the lateral axis. The actuation member may be operable to produce translational movement, such as linear movement, wherein the actuation member is coupled to the reorientation member such that the translational movement of the actuator causes rotational movement of the reorientation portion.

The reorientation conveyor portion may be operable to at least partially eject the mould into the mould-separation portion, when the first and second retainer members are in the second orientation, at a speed of at least 500 mm/min, typically at a speed of at least 750 mm/min, more typically at least 1000 mm/min. The reorientation conveyor portion may be operable to at least partially eject the mould into the mould-separation portion, when the first and second retainer members are in the second orientation, at a speed of less than 10000 mm/min, typically at a speed of less than 5000 mm/min, more typically less than 2000 mm/min. The reorientation conveyor portion may be operable to at least partially eject the mould into the mould-separation portion, when the first and second retainer members are in the second orientation, at a speed of about 500 to 10000 mm/min, typically at a speed of about 750 to 5000 mm/min, more typically about 1000 to 2000 mm/min.

The apparatus may further comprise a support member. The support member may be operable to restrict the lateral movement of the mould to help keep the mould aligned for dosing. The support member may be attached to opposing sides of a retainer member. The support member may comprise a runner which is operable to restrict the lateral movement of the mould. The support member may comprise a pivot attachment member operable to mount the actuation member.

The reorientation conveyor portion may be operable to at least partially repossess the mould that has been at least partially ejected into the mould-separation portion so that at least partial re-closure of the first and second parts of the mould occurs. The conveyor of the reorientation conveyor portion may be operable to move in a forward and reverse direction. The repossessing of the mould by the reorientation conveyor portion may actuate re-closure of the first and second parts of the mould. The repossessing of the mould may occur whilst the mould is still being dosed by the dosing member. The reorientation conveyor portion may be operable to return to the first orientation while substantially maintaining the first part of the mould in the same position relative to the second part of the mould.

The reorientation conveyor portion may be operable to move from the second orientation to a third orientation. The third orientation may be different to the first and second orientations. Preferably, the reorientation conveyor portion is operable to return to the first orientation such that the filled mould can be ejected out of one end of the reorientation conveyor portion into the outfeed conveyor portion, and the reorientation conveyor portion may receive an empty mould in another end.

The conveyor of the reorientation conveyor portion may comprise a belt conveyor. Preferably, both the first and second retainer members of the reorientation conveyor portion comprise a conveyor, typically, a belt conveyor. When both of the first and second retainer members of the reorientation conveyor portion comprise a conveyor, the conveyors may be operable to move at the same speed such as to maintain synchronisation between the movement of the conveyors. The belt conveyor may comprise a high-grip belt. The high-grip belt may comprise grooves.

Advantageously, the combination of a high-grip conveyor belt with the compression generated by the biasing member may provide further improved control of the mould during reorientation and dosing of the mould.

The use of "conveyor" herein is intended to refer to a device which is operable to move a mould from one location to another while in contact with the mould, such as a belt conveyor, chain conveyor or a roller conveyor.

The use of "longitudinal" and "lateral" herein, when referring to the reorientation conveyor portion, is such that longitudinal refers to an axis extending substantially through the ends of the reorientation conveyor portion in the direction of the conveyor movement (as shown in FIG. 1 as axis X) and "lateral" refers to an axis extending substantially perpendicular to the longitudinal axis (as shown in FIG. 1 as axis Y).

The mould-separation portion may comprise guiding members. The guiding members of the mould-separation portion may comprise grooves. The guiding members may be operable to arrange the mould into the dosing portion. The guiding members may be operable to arrange the mould in an at least partially open position in which a portion of the mould parts are abutting and a portion of the mould parts are spaced, preferably in this open position the mould is operable to receive a portion of a moulding composition from a dosing member arranged above the mould. The first and second retainer members may be operable to move the mould along the guiding member.

The reorientation conveyor portion may be arranged, or be operable to be arranged, below the mould-separation portion such that the pivot point of the reorientation conveyor portion is arranged proximal to the vertical axis of the mould-separation portion and distal to an end of the reorientation conveyor portion.

The mould may be for manufacturing a packing member from a liquid ceramic composition. The mould may comprise a first part and a second part. The first part and/or the second part may comprise an open mould cavity and the first and second parts may be operable to engage to form a closed mould cavity. The mould may further comprises a reservoir forming member, wherein the mould is operable to be moved from an open position in which the first and second parts are at least partially spaced such that the reservoir member forms a reservoir cavity and the mould cavity is open, to a partially closed position in which the location of the reservoir cavity has moved with respect to the mould cavity and/or the volume of the reservoir cavity has reduced, and then to a closed position in which the first and second parts are engaged such that the mould cavity is closed.

The first and second parts may each comprise an open mould cavity. Suitably, the mould cavity of the first and second parts may be open partial mould cavities and the first and second parts of the mould are operable to engage such that the partial mould cavity of the first part aligns with the partial mould cavity of the second part to form a closed enlarged mould cavity.

"Open" mould cavity when used herein may mean that the packing member or green body, or part thereof, is operable to be removed from the mould cavity via the same aperture through which the liquid ceramic composition is introduced into the mould cavity. "Closed" mould cavity when used herein may mean that the liquid ceramic composition is held within the mould cavity such that it is not able to leave the mould cavity.

The first and/or the second parts may comprise a plurality of open mould cavities. Suitably, each of the first and/or second parts may comprise a plurality of open partial mould cavities.

The mould cavity may comprise texturing that is operable to produce surface structures on the packing member. Suitably, the face of the mould cavity that is operable to contact the liquid ceramic composition during moulding may comprise texturing.

The mould cavity may comprise a pin operable to form bore in the packing member, such as a bore extending through the packing member. Suitably the mould cavity may comprise at least two pins, such as at least three or at least four pins. The pin may be arranged on the bottom face of the mould cavity and extend upwardly toward the opening of the mould cavity. The pin may be arranged substantially centrally on the bottom face of the mould cavity. The pin may be cylindrical.

The reservoir member may be operable to form a reservoir cavity that can receive and hold a liquid ceramic composition. The reservoir cavity may not be a moulding cavity such that in the closed position the reservoir cavity is substantially not operable to hold a portion of the composition or form a moulded product.

The reservoir member may comprise a first reservoir member arranged on the first mould part and a second reservoir member arranged on the second mould part, wherein the first and second reservoir members are operable to cooperatively engage to form a reservoir cavity. Suitably, the first and second reservoir members may be male and female reservoir members, such that the male reservoir member is operable to be received into the female reservoir member to form a reservoir cavity. The male reservoir member may be in the form of a tongue and the female reservoir member may be in the form of a groove. The male and female reservoir members may be operable to form a tight-fit when engaged. By "tight-fit" herein it is meant a fit that is operable to prevent the liquid ceramic composition from passing through the engaged reservoir members.

The first and/or second mould part may comprise reservoir members, suitably tongue or groove, extending along opposing sides of the mould cavity of the mould part, suitably longitudinally extending reservoir members. Suitably, the first and second mould parts may each comprise a mould cavity and the first reservoir member comprises tongues extending along opposing sides of the mould cavity of a mould part and the second reservoir member comprises grooves extending along opposing sides of the mould cavity of a mould part. The reservoir members of the mould parts may further comprise a base reservoir member extending between the side reservoir members. The base reservoir member may extend laterally along the mould part. The base member may be arranged below the mould cavity of the mould part. Suitably, the first reservoir member may comprise a base tongue extending between the opposing side tongues, and/or the second reservoir member comprises a base groove extending between the opposing side grooves. Such a reservoir member configuration may be in the form of a U-shape, wherein the side reservoir members extend longitudinally along the mould part and the base reservoir member extends laterally along the mould part between the side reservoir members. The base reservoir member may provide the bottom inner face, or base, of the reservoir cavity in use. The side reservoir members may provide the side faces of the reservoir cavity in use. The surface of the mould part extending between the side reservoir members, which may also contain the mould cavity may provide the front and rear faces of the reservoir cavity. Typically, the reservoir cavity comprises a mouth. The mouth may extend between the ends of the side reservoir members that are not connected to a base reservoir member. Suitably, the mouth of the reservoir cavity may extend laterally across the mould part, typically substantially parallel with the base reservoir member.

The first and/or second mould part may comprise a plurality of mould cavities in a grouping. The side reservoir members may be arranged to extend along opposing sides of the grouping. The base member may be arranged to extend below the grouping.

The reservoir member of the mould part may be arranged on the same face as the mould cavity. The reservoir members of the mould parts may be arranged such that engagement of the reservoir members is operable to align partial mould cavities on the mould parts to form an enlarged mould cavity in the closed position.

As such, when the mould is in the open position the reservoir members may be operable to engage to form a reservoir cavity that is operable to receive a liquid ceramic composition through the mouth of the reservoir cavity and then hold the liquid ceramic composition in the reservoir cavity. A mould cavity may be arranged within the initial reservoir cavity when the mould is in the open position. A mould cavity may also be arranged outside of the initial reservoir cavity when the mould is in the open position. As the mould is moved from the open position to the partially closed position, such as by repossession by the reorientation conveyor portion, and then the closed position the reservoir members of the mould part may be operable to further engage such that the reservoir cavity moves along the grouping of mould cavities to close the now filled mould cavities in the initial reservoir cavity and to transfer the remaining composition into the relocated reservoir cavity and into new mould cavities. This movement may continue until the reservoir members are fully engaged such that the mould cavities are closed, suitably by engagement between the mould parts over the mould cavities. Typically, the reservoir cavity has a smaller volume than the combined volume of the mould cavities of the mould.

The first and/or second mould part may be resiliently deformable. The mould may be operable to be moved from the open position in which the first and second parts are partially spaced by deforming a mould part, to the partially closed position by reducing the deformation of the mould part, and to the closed position by further reducing the deformation of the mould part.

The mould may comprise a first part and a second part, wherein the first and/or second mould parts are resiliently deformable and wherein the first part and/or the second part comprise a plurality of open mould cavities, wherein the first and second parts are operable to engage to form closed mould cavities, and wherein the mould is operable to be moved from an open position in which the first and second parts are partially spaced by the deformation of a mould part and in which position mould cavities are open, to a partially closed position by reducing the deformation of the mould part and in which position some of the mould cavities are closed, and then to a closed position by further reducing the deformation of the mould part and in which position the first and second parts are engaged such that the mould cavities are closed.

The first and/or second mould part may be formed of a polymeric material, such as silicone. The silicone may be formed from a two-part silicone composition, comprising a silicone resin and a curing agent or catalyst.

The material forming the first and/or second mould part may have a shore hardness of at least 5, such as at least 10, or at least 15, such as at least 20. The material forming the first and/or second mould part may have a shore hardness of up to 40, such as up to 35 or up to 32, such as up to 30. The material forming the first and/or second mould part may have a shore hardness of from 5 to 40, such as from 10 to 35 or from 15 to 32, such as from 20 to 30. Advantageously, it has been found that a material having a shore hardness within the abovementioned ranges provides a mould that has the flexibility to allow for effective moulding according to the present invention whilst maintaining sufficient shape and rigidity. As described herein, shore hardness was measured using ASTM D2240 type A.

The material forming the first and/or second mould part may have a shrinkage rate of up to 1%, such as up to 0.5%, or up to 0.4%, such as up to 0.3%. Advantageously, it has been found that materials having a shrinkage rate within the abovementioned ranges provides a mould that has improved alignment between the mould parts. As described herein, shrinkage rate may refer to the amount of dimensional change, suitably over a period of 1 week, such as a period of 1 month or a period of 3 months.

A mould part may comprise a retaining member operable to assist with maintaining the relative alignment of the first and second mould parts. The mould part may comprise a retaining member that is operable to assist with maintaining the alignment of the mould part during dosing of the liquid ceramic composition into the mould. The dosing retaining member may be arranged outside of the reservoir cavity, e.g., not to provide an internal face of the reservoir cavity. Typically, the dosing retaining member is not directly attached to the reservoir member. The dosing retaining member may comprise cooperating members arranged on the first and second mould parts. The cooperating dosing retaining members may be male and female such that the male retaining member can be received into the female retaining member to assist with alignment of the mould parts. The male retaining member may be a tongue and the female alignment member may be a groove. The retaining member of the mould part may be arranged below the base of the reservoir cavity. The retaining member may extend laterally along the mould part, substantially parallel with the base of the reservoir cavity or base reservoir member. Advantageously, the use of a dosing retaining member allows for a larger initial reservoir cavity to be formed whilst retaining good alignment of the mould parts.

The mould part may comprise a post-dosing retaining member operable to assist with retaining alignment of the mould cavities after dosing of the liquid ceramic composition. The post-dosing retaining member may be arranged outside of the reservoir cavity, e.g. such as to not provide an internal face of the reservoir cavity. The post-dosing retaining member may comprise cooperating members arranged on the first and second mould parts. Suitably, the cooperating post-dosing retaining members may be male and female such that the male retaining member can be received into the female retaining member to assist with retaining alignment of the mould parts. The male retaining member may be a tongue and the female alignment member may be a groove. The post-dosing retaining member may be arranged laterally adjacent to the mould cavity or grouping of mould cavities. The retaining member may extend laterally along the mould part. The post-dosing retaining member may comprise a set of multiple retaining members arranged on each side of the mould cavity or mould cavity grouping, suitably laterally adjacent to the mould cavity or mould cavity grouping. The retaining member sets may each comprise at least two retaining members spaced longitudinally along the mould part, such as at least three retaining members. Advantageously, the use of a post-dosing retaining member allows for improved retention of alignment between the mould parts after dosing of the composition.

The mould part may comprise a recess arranged above the mould cavity, suitably above the mouth of the reservoir cavity. Typically, the recess is elongated, and may extend substantially parallel with the base of the reservoir cavity or base reservoir member. The recess may be operable to receive any excess composition contained in the reservoir cavity when the mould parts reach the closed position.

The mould part may comprise a guide member. The guide member may extend outwardly from the mould part, such as laterally outwardly of the mould part. The mould part may comprise guide members arranged on each of two opposing faces of the mould part, suitably on two opposed side faces of the mould part. The mould part may comprise at least three guide members on each of two opposing faces of the mould part, such as at least 4, at least 5 or at least 6 guide members. The face of the mould part may comprise guide members arranged toward opposing ends of the face and an intermediate guide member arranged between the end guide members.

The mould part may comprise a reinforcing member, suitably the reinforcing member may be more rigid than the body of the mould part. The reinforcing member may be arranged at least partially within the mould part body. The reinforcing member may substantially extend from one end of the mould part body to another end, such as to an opposing end. The reinforcing member may protrude from the mould part to provide a guiding member. Suitably the reinforcing member may protrude on opposing sides of the mould part to provide guide members on opposing sides of the mould part. As such, the guide member may be provided by a protruding reinforcing member.

The packing member may be formed from a cast moulding composition or slip, such as a clay or non-clay castable composition, liquid cement or gel-cast composition. As such, the liquid ceramic composition may be a gel-cast composition, suitably the composition may comprise a ceramic material, an organic binder component and optionally a pore forming component.

The organic binder component may be operable to be substantially removed from the packing member after moulding of the packing member, preferably with heat treatment, more preferably removed during calcination of the packing member.

The organic binder component may comprise a polymerisable component, suitably the polymerisable component may comprise a polymerisable monomer and a crosslinking member, wherein the binder component is operable to polymerise to form a (co)polymer.

The polymerisable monomer may comprise one or more type of ethylenically unsaturated monomers, such as an acrylic monomer or derivative thereof such as an acrylamide monomer, and/or a vinyl monomer, such as a monomer selected from one or more of methacrylamide (MAM), N-(hydroxymethyl)acrylamide (hMAM), hydroxyethyl acrylamide (hEAM) and/or N-vinyl-2-pyrrolidinone (NVP). Preferably, the polymerisable monomer comprises one or more acrylamide monomers, more preferably a monomer selected from one or more of methacrylamide (MAM), N-(hydroxymethyl)acrylamide (hMAM) and hydroxyethyl acrylamide (hEAM). Most preferably, the polymerisable monomer comprises MAM.

The crosslinking member may be selected from one or more of a diethylenically unsaturated monomer, such as a diacrylic monomer or derivative thereof such as a diacrylamide monomer, an acrylic salt and/or a polyethylene glycol substituted acrylic monomer. The crosslinking member may be selected from one or more of poly(ethylene glycol) dimethacrylate (PEGDMA), N,N'-methylenebis(acrylamide) (BIS), ammonium acrylate and PEG methylethylmethacrylate (PEGMEM), preferably one more of poly(ethylene glycol) dimethacrylate (PEGDMA), and N,N'-methylenebis (acrylamide) (BIS).

The organic binder component may be formed from 40 to 95 wt % of polymerisable monomer and from 60 to 5 wt % of crosslinking member, such as from 50 to 90 wt % of polymerisable monomer and from 50 to 10 wt % of crosslinking member, or from 55 to 85 wt % of polymerisable monomer and from 45 to 15 wt % of crosslinking member, or from 60 to 80 wt % of polymerisable monomer and from 40 to 20 wt % of crosslinking member, such as from 65 to 75 wt % of polymerisable monomer and from 35 to 25 wt % of crosslinking member.

The composition may further comprise a polymerisation accelerator, operable to accelerate the polymerisation of the binder component. The polymerisation accelerator may be any suitable accelerator. For example, the accelerator may be tetramethylethylenediamine (TEMED).

The composition may further comprise an initiator operable to initiate polymerisation of the binder component. The initiator may be any suitable initiator. The initiator may be a free radical initiator. For example, the initiator may be ammonium persulphate and/or potassium persulphate.

The pore forming material may be operable to be removed from the packing member after moulding of the packing member, preferably with heat treatment, more preferably during calcination of the packing member. The pore forming material may be selected from one or more of microbeads, starch, seeds and/or cellulose.

The pore forming material may have a particle size distribution wherein $D_{10}$ is from 5 to 100 μm, preferably from 10 to 75 μm, more preferably from 15 to 50 μm, most preferably from 20 to 40 μm. The $D_{50}$ of the pore forming material may be from 50 to 200 μm, preferably from 75 to 175 μm, more preferably from 90 to 160 μm, most preferably from 100 to 150 μm. The $D_{90}$ of the pore forming material may be from 120 to 300 μm, preferably from 150 to 270 μm, more preferably from 170 to 250 μm, most preferably from 185 to 235 μm.

The ceramic material may be a refractory ceramic material. The ceramic material may comprise aluminium oxide, aluminium silicate, magnesium aluminate, calcium aluminate, zirconia, silica, titanate, carbon and/or magnesium oxide.

The ceramic material may have a particle size distribution wherein $D_{10}$ is from 0.1 to 20 μm, preferably from 0.5 to 10 μm, more preferably from 1 to 5 μm, most preferably from 1.5 to 3 μm. The $D_{50}$ of the pore forming material may be from 0.5 to 30 μm, preferably from 1 to 25 μm, more preferably from 1.5 to 20 μm, most preferably from 2 to 15 μm. The Do of the pore forming material may be from 10 to 100 μm, preferably from 15 to 80 μm, more preferably from 20 to 70 μm, most preferably from 25 to 60 μm.

The ceramic material may be a ceramic powder. The ceramic powder may be ball milled or spray dried. Advantageously, it has been found that ball milled or spray dried ceramic powder provides easier casting behaviour.

The composition or packing member may comprise a promoter, operable to increase the reactivity of the main reaction, and/or decrease undesirable side reactions. The promoter may be selected from one or more of oxides of lanthanum, copper, magnesium, manganese, potassium, calcium, zirconium, barium, cerium, sodium, lithium, molybdenum, yttrium, cobalt, and chromium.

The composition may further comprise a carrier, such as aqueous carrier. Suitably the composition may be an aqueous ceramic slurry.

The composition may comprise further additives. For example, the composition may comprise a dispersant, such as a polymeric salt, for example a salt of a polyacrylic, preferably an ammonium salt of a polyacrylic. A suitable dispersant may be selected from one or more of Ecodis P90, Narlex LD42 and Dispex A40.

The composition may comprise from 0.1 to 10% of polymerisable monomer by dry weight of the composition, preferably from 0.5 to 8 wt %, more preferably from 1 to 6 wt %, such as from 1.5 to 5 wt %, most preferably from 2 to 4 wt %.

The composition may comprise from 0.1 to 10% of crosslinking member by dry weight of the composition, preferably from 0.5 to 8 wt %, more preferably from 0.75 to 6 wt %, such as from 1 to 5 wt %, most preferably from 1 to 4 wt %.

The composition may comprise from 50 to 95% of ceramic material by dry weight of the composition, preferably from 50 to 90 wt %, more preferably from 55 to 85 wt %, most preferably from 60 to 80 wt %. The packing member may comprise at least 75% of ceramic material by dry weight of the composition, preferably at least 85 wt %, more preferably at least 90 wt %, such as at least 95 wt %, most preferably at least 97 wt % ceramic material.

The composition may comprise from >0 to 40% of pore forming member by dry weight of the composition, preferably from 0.5 to 30 wt %, more preferably 2 to 25 wt %, such as from 3 to 20 wt %, most preferably from 4 to 15 wt %.

The composition may comprise from 0.1 to 5% of initiator by dry weight of the composition, preferably from 0.5 to 4 wt %, more preferably from 0.75 to 3.5 wt %, most preferably from 1 to 3 wt %.

The composition may comprise up to 5% of accelerator by dry weight of the composition, preferably up to 3 wt %, more preferably up to 2 wt %, most preferably up to 1.5 wt %.

The composition may comprise from 0.1 to 10% of dispersant by dry weight of the composition, preferably from 0.5 to 8 wt %, more preferably 0.75 to 6 wt %, most preferably from 1 to 5 wt %.

The composition may have a solids content of from 45 to 99% by total weight of the composition, such as from 50 to 95 wt %, preferably from 55 to 90 wt %, most preferably from 60 to 85 wt %.

The composition may be formed by combining a preformed aqueous binder component with a ceramic composition. Suitably the aqueous binder component may comprise a polymerisable monomer, a crosslinking member and water.

Prior to contacting the liquid ceramic composition with the mould, the composition may be contacted with an initiator and optionally a polymerisation accelerator.

The packing member may be an inert packing member. As such, the inert packing member may be substantially free of catalytic material. Advantageously, the use of inert packing member according to the present invention in a catalyst bed provides improved heat transfer and gas flow turbulence which helps the reactive media further along the reactor to be at a suitable temperature for the desired reaction.

The packing member, or support, may be a supported catalyst with the inclusion of catalytic material. The catalytic material may be operable to provide catalytic activity in the desired process to which the supported catalyst is applied.

The catalytic material may comprise a metal selected from one or more of a transition metal, suitably a transition metal oxide, and/or a noble metal, suitably an alloy thereof. The catalytic material may comprise a metal selected from one or more of iron, nickel, silver, gold, platinum, ruthenium, vanadium, molybdenum, and cobalt.

The composition may be mixed before arranging in the mould to form a homogeneous slurry, suitably before addition of initiator and the optional accelerator. The composition may be mixed after addition of the initiator and the optional accelerator to form a homogeneous slurry.

The mould is preferably a cast mould. The mould may be operable to form surface structures on the green body.

The packing member may be impregnated with catalytic material by dipping the packing member into a solution of the catalytic material. The dipped packing member may be dried after dipping.

Advantageously, the present invention enables the green support or supported catalyst body to be removed from the mould while it is in a form that is still relatively rubbery, allowing for easier handling. This leads to a lower scrap rate than other types of casting techniques.

The mould-separation portion of the apparatus of the present invention may be operable to guide the mould into the open configuration, suitably by the guiding members of the mould-separation portion receiving the guide members of the mould. Suitably, the guiding member may comprise a portion that is operable to arrange the mould in a closed, or at least partially closed, position and a portion that is operable to arrange the mould in position in which the mould parts are at least partially spaced in an open position. The mould may be operable to move in the guiding member from the closed portion of the guiding member to the spacing portion of the guiding member. Typically, the guiding member is operable to arrange the mould in an open position in which a portion of the mould parts are abutting and a portion of the mould parts are spaced, suitably in a position in which a dosing-retaining member may be engaged while a mould cavity is open and reservoir cavity formed. The guide member may be operable to arrange the mould in a position in which a dosing-retaining member is engaged and/or portions of the mould parts are abutting while a mould cavity is open and reservoir cavity formed, wherein the open mould cavity and/or reservoir cavity is arranged above the engaged dosing-retaining member and/or abutting portions of the mould parts.

The dosing member may be operable to dispense a liquid ceramic composition into the mould. Suitably, the dosing member may be arranged above the mould-separation portion.

The packing member may comprise ceramic material and further comprise surface structures on the outer surface of the packing member. The packing member may not comprise a fluid communication intra-particle channel extending through the packing member from a first aperture on a first side of the packing member to a second aperture on a substantially opposing second side of the packing member.

When the packing member does not comprise a fluid communication intra-particle channel extending through the packing member from a first aperture on a first side of the packing member to a second aperture on a substantially opposing second side of the packing member fluid may be substantially not able to flow through the packing member in use from a first side of the packing member to a substantially opposite second side of the packing member. Accordingly, to pass the packing member fluid may be forced to flow around the outer surface of the packing member. As such, in this context, the phrase "does not comprise a fluid communication intra-particle channel extending through the packing member from a first aperture on a first side of the packing member to a second aperture on a substantially opposing second side of the packing member" may be interpreted to mean that substantially no fluid flow is achieved through the body of the packing member in use from a first side of the packing member to a substantially opposite second side of the packing member. It will be understood that such "fluid communication intra-particle channels" in this context does not include microscopic porosity that may be present in the material of the packing member.

The packing member may comprise no fluid communication intra-particle channels in the packing member extending from a first aperture to a second aperture.

The packing member may have a macrostructure that is substantially in the form of a multi-lobe, for example a trilobe, quadralobe or pentalobe; a sphere; an ellipsoid, a cube; a cuboid; a cylinder; or a cog. The packing member may not have a substantially spherical or ellipsoidal macrostructure.

The packing member may be a catalyst support, suitably a ceramic catalyst support. The packing member may be a supported catalyst.

The support may have a substantially spherical or ellipsoidal macrostructure and comprise surface structures. The support may have a porosity of ≥0.35 $cm^3/g$, preferably ≥0.40 $cm^3/g$, more preferably ≥0.45 $cm^3/g$, most preferably ≥0.50 $cm^3/g$.

The support may be for a catalyst for use in a packed-bed reactor for the production of an alkylene oxide. The support may further be in the form of a supported catalyst by further comprising catalytic material. The support may also be in the form of an insert packing member wherein suitably the support is substantially free of catalyst material.

The supported catalyst may be for use in a packed-bed reactor for the production of an alkylene oxide, wherein the supported catalyst comprises ceramic material. The supported catalyst may have a substantially spherical or ellipsoidal macrostructure and comprises surface structures.

The support/supported catalyst may be for use in a packed-bed reactor for the production of an alkylene oxide such as ethylene oxide, 1,9-decadiene oxide, 1,3-butadiene oxide, 2-butene oxide, isobutylene oxide, 1-butene oxide and/or propylene oxide, suitably for ethylene oxide.

The packing member may be a cast packing member, such as a gel-cast packing member. The packing member may have a geometric surface area per volume (GSA) of ≥0.7 $cm^2/cm^3$ and a side crush strength of ≥250 kgf; such as a GSA of ≥1 $cm^2/cm^3$, preferably a GSA of ≥1.2 $cm^2/cm^3$, more preferably a GSA of ≥1.3 $cm^2/cm^3$, most preferably a GSA of ≥1.4 $cm^2/cm^3$. The packing member may have a side crush strength of ≥275 kgf, preferably ≥300 kgf, more preferably ≥325 kgf, most preferably ≥350 kgf.

The packing member may have a GSA of ≥1.5 $cm^2/cm^3$ and a side crush strength of ≥150 kgf; such as a GSA of ≥1.7 $cm^2/cm^3$, preferably a GSA of ≥1.9 $cm^2/cm^3$, more preferably a GSA of ≥2.1 $cm^2/cm^3$, most preferably a GSA of ≥2.3 $cm^2/cm^3$. The packing member may have a side crush strength of ≥170 kgf, preferably ≥185 kgf, more preferably ≥200 kgf, most preferably ≥215 kgf.

The packing member may have a GSA of ≥3 $cm^2/cm^3$ and a side crush strength of ≥60 kgf, such as a GSA of ≥3.3 $cm^2/cm^3$, preferably a GSA of ≥3.6 $cm^2/cm^3$, more preferably a GSA of ≥3.9 $cm^2/cm^3$, most preferably a GSA of ≥4.2 cm$^2$/cm$^3$. The packing member may have a side crush strength of ≥70 kgf, preferably ≥80 kgf, more preferably ≥90 kgf, most preferably ≥100 kgf.

GSA herein is calculated by measuring the external dimensions of the packing member, including all macrostructure and surface structure features and calculating the surface area. The calculated surface area is then divided by the calculated volume of the packing member. Suitable 3D modelling software can be used to provide these calculations quickly and accurately.

Side crush strength herein is represented by a value given in kgf. This is the maximum load recorded at the point of failure of the sample when pressed & crushed between two parallel, flat, hardened steel plates of minimum diameter 80 mm. One plate is fixed to a load cell & recording device, and the other is attached to a ram which moves at a controlled rate of 5 mm/minute. Initial trial tests are carried out to determine the dimension in which the packing member is weakest. The side crush test is then carried out in the weakest direction.

The packing member may have a porosity of ≥6%, preferably ≥15%, more preferably ≥20%, most preferably ≥25%. The packing member may have a porosity of from 6 to 50%, preferably from 15 to 40%, more preferably from 20 to 35%, most preferably from 25 to 30%. Suitably, the support may have a porosity of ≥15%, more preferably ≥20%, most preferably ≥25%. The support may have a porosity of from 15 to 50%, more preferably from 20 to 40%, most preferably from 25 to 35%.

Porosity herein is measured by mercury intrusion porosimetry, using ASTM D4284-12(2017)e1, Standard Test Method for Determining Pore Volume Distribution of Catalysts and Catalyst Carriers by Mercury Intrusion Porosimetry.

The packing member may have a macrostructure and surface structures on the outer face of the macrostructure. Typically, the surface structures of the packing member are formed during the moulding step of the packing member, i.e. the step in which the green body of the packing member is formed, suitably by appropriate texturing in the mould cavity. As such, preferably the surface structures are not post-fabricated after the moulding of the green body of the packing member.

The macrostructure may be in the form of a multi-lobe, for example a trilobe, quadralobe or pentalobe; a ring; a sphere; a cube; a cuboid; a cylinder; or a cog.

The cog macrostructure comprises a plurality of castellations extending radially outwards. A cog macrostructure may have lateral cross-sections that include substantially circular, triangular, square or rectangular etc when excluding the castellations. At least some, and preferably all, of the castellations may be tapered along the depth and/or the width of the castellation, preferably each castellation is tapered in the same direction as the other castellations of the cog, suitably the widest and deepest points of the castellation may be toward the same end of the castellation.

The macrostructure may have a depressed upper and/or lower face, suitably at least 30% of the upper and/or lower face is depressed, such as at least 40% or at least 50%. It will be appreciated that a bore extending through the macrostructure is not a depression in the upper and/or lower face according to the present invention.

Advantageously, a cog macrostructure having tapered castellations and/or depressed upper or lower face has been found to provide improved packing density in combination with reduced interlocking.

A spherical macrostructure may comprise at least one linear trough on the outer face of the macrostructure, such as at least two, at least three or at least four linear troughs. Preferably, a spherical macrostructure comprises at least two linear parallel troughs, such as at least three or at least four. Preferably, the troughs are substantially hemispherical in a lateral cross-section.

The macrostructure may be a monolith or comprise one or more bores extending through the macrostructure. Preferably, the packing member comprises at least one bore extending through the macrostructure, more preferably, the macrostructure comprises at least three bores. The macrostructure may be a honeycomb structure. The bores of the macrostructure may be straight cut or faceted.

The packing member may comprise a plurality of surface structures, suitably a plurality of repeating surface structures. Preferably, the packing member comprises at least 5 surface structures, suitably repeating surface structure moieties, more preferably at least 10, such as at least 15, or at least 20, most preferably at least 25.

By surface structures it is meant raised and/or depressed portions on the support the height of which are significantly smaller than the width/diameter of the macrostructure of the packing member. Such surface structures may be considered to be surface texturing over the macrostructure of the packing member. The surface structures may be considered to not include microscopic surface roughness. For example, the packing member may be of cuboidal macrostructure having a width of 32 mm and a length of 50 mm. The outer face of this packing member may comprise a plurality of surface structures in the form of a plurality of repeating identical discrete mounds wherein each mound has a height of 2 mm. It will be appreciated that normal features of a macrostructure such as the plurality of castellations of a cog or the lobes of multilobe are not considered to be surface structures according to the present invention.

The surface structures may be in the form of ridges and/or mounds.

The ridges may be in the form of annular ridges, wherein said annular ridges are not restricted to a circular shape. The annular ridges may be in the form of a substantially circular shape or a regular convex polygen, such as a triangle, square, pentagon, hexagon, heptagon, octagon, nonagon, or decagon. Preferably the annular ridges are in the form of a regular convex polygen, more preferably pentagon, hexagon or heptagon, most preferably hexagon. The portion of the surface structure extending between the annular ridges may be flat, sloped and/or curved. For example, the portion of the surface structure extending between the annular ridges may be in the form of an inverted pyramid. The surface structures may comprise a plurality of attached annular ridge structures, suitably interconnected annular ridge structures such that a ridge of at least a first annular surface structure forms part of a second annular surface structure.

The surface structures in the form of mounds may be depressed into the macrostructure or project outwardly from the macrostructure. The mounds may be curved, pyramidal and/or stepped mounds. A stepped mound may comprise between 2 to 10 steps, such as between 3 and 8 steps. The mounds may interconnect such that adjacent mounds abut or are merged together.

The mean average height of the surface structures of the packing member may be up to 10 mm, preferably up to 7 mm, more preferably up to 6 mm, most preferably up to 5 mm.

The mean average height of the surface structures of the packing member may be at least 0.1 mm, such as at least 0.3 mm, preferably at least 0.5 mm, more preferably at least 0.7 mm, most preferably at least 0.8 mm. The height of the surface structures herein is measured using callipers with a depth measurement function.

The packing member may have a largest dimension of up to 1000 mm, such as up to 750 mm or up to 500 mm, preferably up to 400 mm. The packing member may comprise a width/diameter of up to 500 mm, such as up to 300 mm, or up to 200 mm, preferably up to 150 mm, more preferably up to 100 m, most preferably up to 50 mm.

The mean average height the surface structures of the packing member may be up to 40% of the width/diameter of the packing member, such as up to 30%, preferably up to 25%, more preferably up to 20% and most preferably up to 15%.

The surface structures may extend over at least two faces of the packing member, such as at least a side face and a top face and/or bottom face.

The surface structures may extend over at least 50% of the side face of the packing member, such as at least 60%, preferably at least 70%, more preferably at least 80% and most preferably at least 85%. The surface structures may extend over at least 50% of the outer face of the packing member, such as at least 60%, preferably at least 70%, more preferably at least 80% and most preferably at least 85%. Where the surface structures include a repeating series of ridges, such as annular ridges, the surface extending between the ridges is included as part of the surface structure for this calculation even when that surface is substantially flat or where the ridges are not interconnected.

The method of the second aspect of the present invention may be for producing a packing member for use in a packed bed. In such a method, step (c) may cause at least partial separation of the first and second mould parts such that the first part and/or the second part comprise an open mould cavity, wherein the mould further comprises a reservoir forming member, and the mould is arranged in an open position such that the reservoir member forms a reservoir cavity. In such a method, step (d) may comprise at least partially filling the reservoir cavity of the mould with a liquid ceramic composition, moving the mould to a partially closed position such that the location of the reservoir cavity moves with respect to the mould cavity and/or the volume of the reservoir cavity reduces, to transfer a portion of the liquid ceramic composition from the reservoir cavity into the open mould cavity, and moving the mould to a closed position wherein that the first and second parts are engaged to close the mould cavity such that a portion of the liquid ceramic composition is held within the closed mould cavity and is operable to form a green body. Such a method may further comprise heating the green body, demoulding the green body and/or calcining the green body to produce a packing member.

According to a third aspect of the present invention, there is provided a use of an apparatus according to the first aspect of the present invention in the production of a packing member from a liquid ceramic composition.

According to a fourth aspect of the present invention, there is provided a packing member for use in a packed bed, preferably for use as a catalyst support in a packed bed reactor, obtainable by moulding a liquid ceramic composition in a mould using an apparatus according to the first aspect of the present invention and/or by a process according to a second aspect of the present invention.

The use of “mould” herein is intended to refer to a container having a hollow portion that is used to give shape to a liquid composition upon hardening to a solid form. The mould may be a cast, a die or a former, for example.

The use of “longitudinal” and “lateral” herein, when referred to in relation to the reservoir cavity, is such that longitudinal refers to an axis extending substantially through the mouth and the base of the cavity and “lateral” refers to an axis extending substantially perpendicular to the longitudinal axis.

As used herein, unless otherwise expressly specified, all numbers such as those expressing values, ranges, amounts or percentages may be read as if prefaced by the word “about”, even if the term does not expressly appear. Also, the recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0).

Any numerical range recited herein is intended to include all sub-ranges subsumed therein. When ranges are given, any endpoints of those ranges and/or numbers within those ranges can be combined within the scope of the present invention. Singular encompasses plural and vice versa. For example, although reference is made herein to “a” first part and “a” second part, “an” open mould cavity, “a” reservoir forming member, and the like, one or more of each of these and any other components can be used. As used herein, the term “polymer” refers to oligomers and both homopolymers and copolymers, and the prefix “poly” refers to two or more.

The terms “comprising”, “comprises” and “comprised of” as used herein are synonymous with “including”, “includes” or “containing”, “contains”, and are inclusive or open-ended and do not exclude additional, non-recited members, elements or method steps. Additionally, although the present invention has been described in terms of “comprising”, the coating compositions detailed herein may also be described as “consisting essentially of” or “consisting of”.

As used herein, the term “and/or,” when used in a list of two or more items, means that any one of the listed items can be employed by itself or any combination of two or more of the listed items can be employed. For example, if a list is described as comprising group A, B, and/or C, the list can comprise A alone; B alone; C alone; A and B in combination; A and C in combination, B and C in combination; or A, B, and C in combination.

Where ranges are provided in relation to a genus, each range may also apply additionally and independently to any one or more of the listed species of that genus.

All of the features contained herein may be combined with any of the above aspects in any combination.

For a better understanding of the invention, and to show how embodiments of the same may be carried into effect, reference will now be made, by way of example, to the following figures.

DETAILED DESCRIPTION

Figure 1:
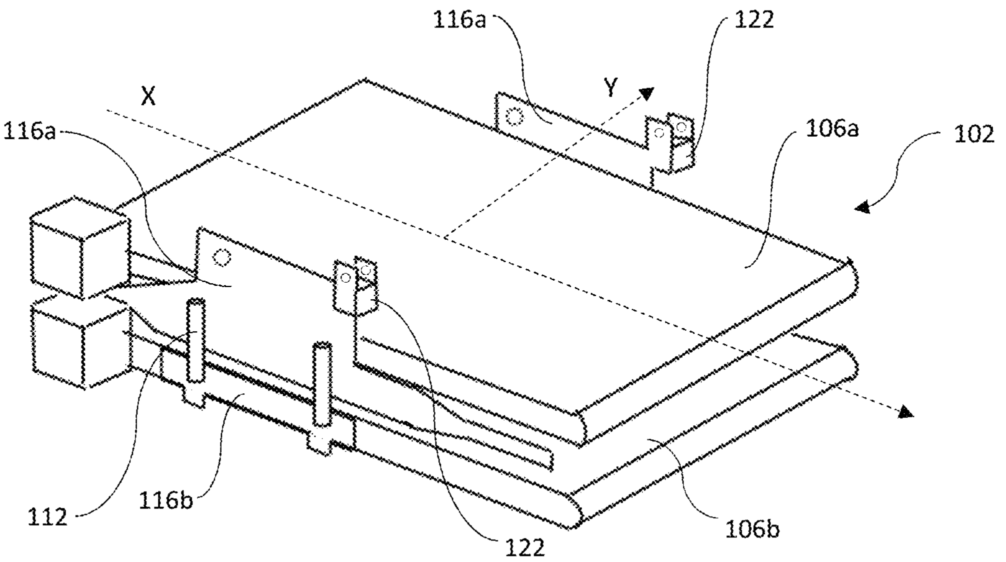
FIG. 1 shows a perspective view of a reorientation conveyor portion of an apparatus according to the present invention.
Figure 2:
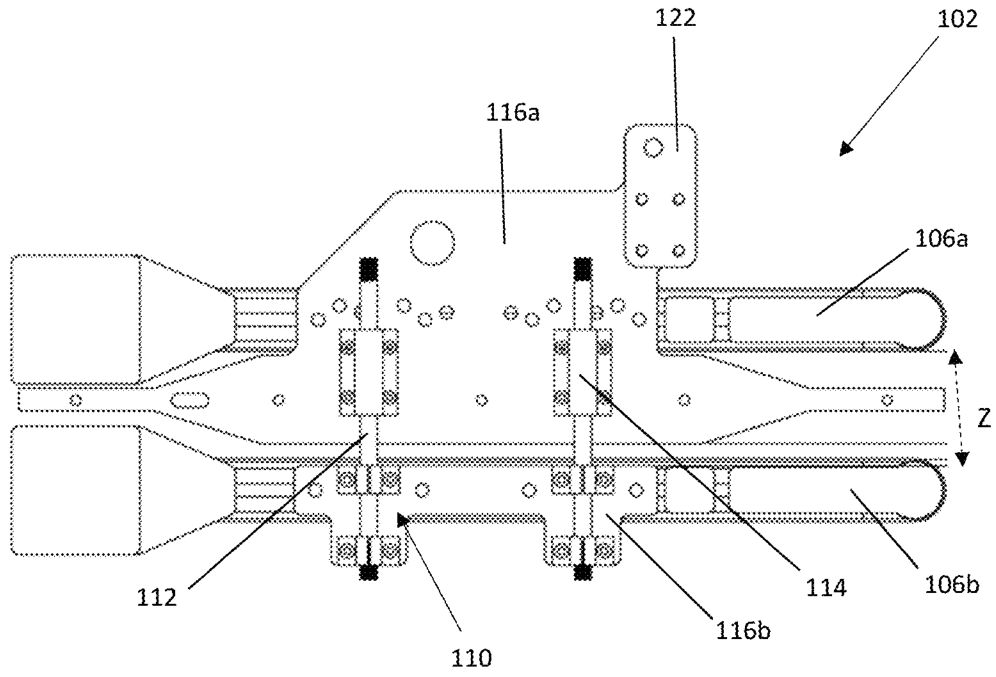
FIG. 2 shows a side plan view of the reorientation conveyor portion of FIG. 1.

The invention will now be described by way of example only and with reference to the accompanying drawings, in which:

FIGS. 1 and 2 show part of an apparatus according to the first embodiment of the invention. The apparatus comprises reorientation conveyor portion 102, mould-separation portion 300, an actuator (not shown) and a dosing member (not shown). Reorientation conveyor portion 102 is formed of a first and second retainer member 106*a* and 106*b*. First and second retainer members 106*a*, 106*b* are rectangular 650 mm long conveyor belts arranged so that the first retainer member 106*a* is located directly above the second retainer member 106*b* and the second retainer member 106*b* is suspended from the first retainer member 106*a*. The first and second retainer members 106*a*, 106*b* are arranged above and parallel to one another such that there is a separation 108 between the first and second retainer members 106*a*, 106*b*. Separation 108 is wide enough to allow a mould to pass between the first and second retainer members 106*a*, 106*b* whilst still maintaining sufficient force to hold the mould through biasing members 110. The reorientation conveyor portion 102 has a longitudinal axis represented in FIG. 1 as axis X and a lateral axis represented as axis Y. The conveyor belts of the first and second retainer members 106*a*, 106*b* can move in both directions along the X axis. The conveyor belts are formed of a high-grip belt with visible grooves.

The first and second retainer members 106*a*, 106*b* are attached together by biasing member 110. Biasing member 110 is a sprung-loaded member. Biasing member 110 is formed of four sprung-loaded bars 112, two on each side of the reorientation conveyor portion 102, which are attached to the first and second retainer members 106*a*, 106*b* via screw attachment members 114. Sprung-loaded bars 112 are cylindrical bars which are vertically attached to the first and second retainer members 106*a*, 106*b* toward ends thereof. Bars 112 bias and support the second retainer member 106*b* towards the first retainer member 106*a* to a separation distance Z. The springs (not shown) to allow the distance between the first and second retainer members 106*a*, 106*b* to vary from separation distance Z to a large separation while biasing the separation distance toward distance Z.

The reorientation conveyor portion 102 also comprises a support member 116. Support member 116 comprises two upper flat plates 116*a* that fixedly attached along opposing sides (on axis Y) of the first retainer member 106*a* and two lower flat plates 116*b* that are fixedly attached along opposing sides of the second retainer member 106*b*. Upper and lower plates 116*a*, 116*b* are arranged parallel to longitudinal axis X extending along the side of the first and second retainer members 106*a*, 106*b*. Upper plates 116*a* extend above and below the first retainer member 106*a* such that it is at least partially covering the sides of the separation 108 between the first and second retainer members 106*a*, 106*b*.

Upper plates 116*a* each comprise a runner (not shown) on the inside surface which extends along the X axis and is located on the portion of upper plates 116*a* that extend below first retainer member 106*a*. As such, the runners are located on the portion of upper plate 116*a* located at the separation 108 between the first and second retainer members 106*a*, 106*b* and extends along the X axis. The runner can cooperate with guide members (not shown) on the mould to keep the mould aligned.

Upper plates 116*a* each further comprise pivot attachment members 122 that are operable to form a pivot point for the reorientation conveyor member 102. Pivot attachment members 122 are offset relative to the reorientation conveyor portion 102 such that they are located proximal to but off-set from the lateral (along the Y axis) centre line of the reorientation conveyor portion 102 while being distal to an end of the reorientation conveyor portion 10. Pivot attachment members 122 each extend upwardly from a top corner of the opposing upper plates 116*a* on each side of the reorientation conveyor member 102. Pivot attachment member 122 comprises a cuboidal shape which has two parallel flat square-shaped projections 124 extending upwardly from the cuboid. Projections 124 are parallel with the X axis and each comprise an aperture. Pivot attachment members 122 are operable to receive a pivot shaft (not shown) extending between the pivot attachment members 122 along the Y axis which pivot shaft is in turn operable to be coupled with an actuator (not shown). The pivot shaft is coupled to the actuator such that the linear movement of the actuator caused rotation of the reorientation conveyor portion 102 about the pivot shaft.

In another embodiment of the reorientation conveyor member (not shown), a first retainer member comprises a fixed unmoving portion (not shown) and a second conveyor member is a belt conveyor. The first retainer member applies pressure to the mould to keep the first and second parts of the mould together during reorientation, while it is the second retainer member which is operable to move the mould.

Figure 3:
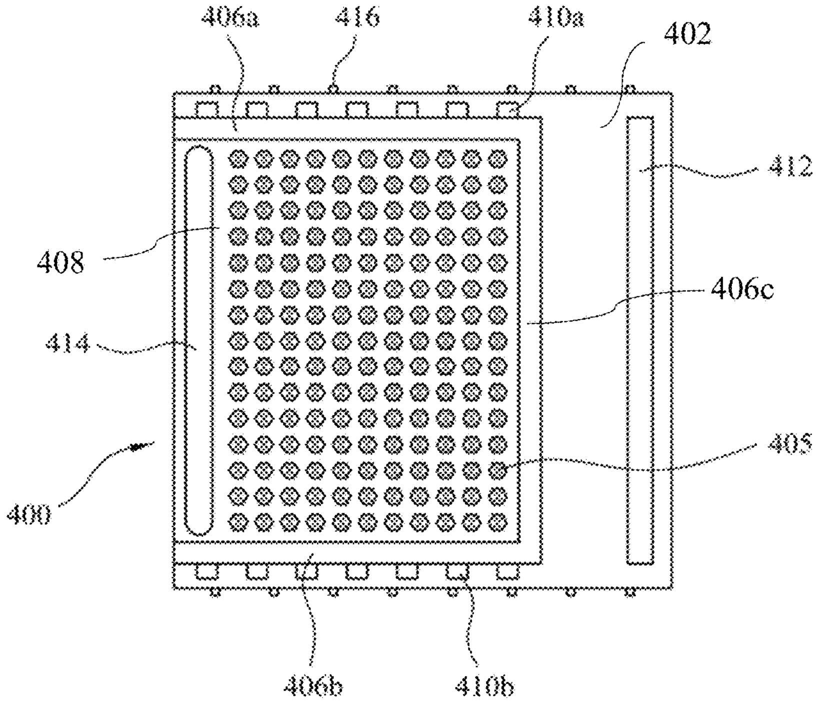
FIG. 3 shows a plan view of a first part of a mould.

FIG. 3 shows a first part of two-part mould 20, which is substantially cuboidal and is formed of a first mould part 400 and a second mould part 500. First part 400 and second part 500 each contain about half of the mass of mould and each are formed of a resiliently deformable two-part silicone-based rubber.

First mould part 400 is formed of substantially cuboidal body 402. Body 402 has a rectangular inner face and a rectangular outer face. The inner face forms an inside face of the mould and the outside face forms an outside face of the mould when the mould parts are engaged. Body 402 also has a rectangular front face, rear face, and two side faces.

The inner face of body 402 has a grouping of twelve discrete generally hemispherical partial mould cavities 405 that contain surface texturing on the moulding surfaces of the cavities. The mould cavities are arranged in a grouping of eleven rows with fifteen cavities 405 per row. The partial cavities 405 are spaced equidistantly from adjacent mould cavities to form a grid-like grouping arrangement located laterally centrally on the inner face. The first row is located proximal to, and parallel with, but spaced from, the edge of the inner face that is adjacent to the front face of the body 405 and the last (eleventh) row is located proximal to, and parallel with, but spaced from the edge of the inner face that is adjacent to the rear face. The first row is closer to its abovementioned edge than the last row is to its respective abovementioned edge. Extending along either side of the grid-like grouping of partial cavities 405 there are side reservoir member cavity 406*a* and 406*b*. Side reservoir member cavity 406*a*, 406*b* are generally cuboidal shaped and which extend longitudinally along the inner face from the edge that is adjacent to the front face to just after the last row of partial cavities 405. Side reservoir members 406*a*, 406*b* are connected at the bottom end (i.e. the end proximal to the rear face of body 402) via base reservoir member tongue 406*c*. Base reservoir member 406*c* is the same depth as side reservoir members 406*a* and 406*b* and it extends laterally across the inner face to connect reservoir members 406*a* and 406*b*. Reservoir members 406*a*, 406*b* are integrally connected at each end of base reservoir member 406*c* to form a generally U-shaped cavity that surrounds the grid-like grouping of partial cavities 405 on both sides and at the bottom (i.e. the end proximal to the rear face of body 402). This enclosure forms part of a reservoir cavity 408, in which the partial cavities 405 are located. The reservoir cavity has a laterally extending mouth in the form of an open end that extends between the ends of the side reservoir members that are not connected to the base reservoir member. As such, the mouth is arranged between the first row of partial cavities and the edge of the inner face that is adjacent to the front face of the body 402.

Mould part 400 further has two sets of three post-dosing cube-shaped retaining members 410*a, b* that is integrally formed on two sides with the inner face and the side reservoir members. Each of the post-dosing retaining members extends outwardly from the inner face and side reservoir members. The first set of retaining members 410*a* is arranged along the outer side face of side reservoir member 406*a* (relative to the reservoir cavity), and the second set of retaining members 410*b* is arranged opposite to the first set on the outer side face of side reservoir member 406*b*. The three retaining members of each of sets 410*a* and *b* are equidistantly spaced longitudinally down the inner face from the adjacent retaining member of the set and each retaining member is directly opposite a corresponding retaining member on the opposite side reservoir member.

Inner face of body 402 is formed of dosing retaining tongue member 412 spaced from, located below, and extending parallel with, base reservoir member 406*c*, and proximal to, and extending parallel with, but spaced from, the edge of the inner face that is adjacent to the rear face. Dosing retaining member 412 is a generally cuboidal protrusion and extends laterally across body 402 and is spaced from the side edges.

An elongate recess 414 is located on the inner face between the mouth of the reservoir cavity 108 and proximal to, but spaced from, the edge of the inner face that is adjacent to the front face of the body 402. Recess 414 is positioned relatively laterally centrally on the inner face between, and spaced from, the side edges of body 402. Recess 414 is generally oval shaped. Recess 114 is generally coterminous with the width of the mouth of the reservoir cavity.

First mould part 400 also has three cylindrical spaced reinforcing rods 416 which extend laterally through the centre mass of body 402 from one side face to the other side face at three different points along body 402. Rods 416 protrude out from the side faces on both sides so that there are three protrusions on either side of the first mould part 400 to act as guide members. Rods 416 are spaced equidistantly along the longitudinal length of body 402.

Second mould part 500 is the same as first mould part 400 but has outwardly extending male equivalents of the reservoir members and retaining members. As such, second mould part 500 has corresponding male reservoir members 506*a,b* which are cuboidal grooves within the body suitable for receiving the reservoir members of the first mould part 400, and also female retaining members 406 allow the male retaining members 506*a,b* to fit within so that they are engaged, and hold the first and second mould parts 400, 500 in alignment. When the first mould cavity 400 and second mould cavity 500 are engaged together the partial cavities 405 form closed enlarged generally spherical mould cavities (not shown). In mould part 500, to engage with the side reservoir members 406*a*, 406*b*, extending along either side of the grid-like grouping of partial cavities 504 protrudes side reservoir member tongues 506*a* and 506*b*. Side reservoir member tongue 506*a*, 506*b* are generally cuboidal shaped with a convex upper face which extend longitudinally along the inner face from the edge that is adjacent to the front face to just after the last row of partial cavities 504. Side reservoir members 506*a*, 506*b* are connected at the bottom end (i.e. the end proximal to the rear face of body 502) via base reservoir member tongue 506*c*. Base reservoir member 506*c* is the same height as side reservoir members 506*a* and 506*b* and it extends laterally across the inner face to connect reservoir members 506*a* and 506*b*. Reservoir members 506*a*, 506*b* are integrally connected at each end of base reservoir member 506*c* to form a generally U-shaped cavity that surrounds the grid-like grouping of partial cavities 504 on both sides and at the bottom (i.e. the end proximal to the rear face of body 502). This enclosure forms part of a reservoir cavity 508, in which the partial cavities 404 are located. Reinforcing rods 416 can fit into grooves 304 on the respective sides of the mould parts to allow the mould 20 to travel along the grooves 304 and to be held vertically so that the front face of mould parts 400 and 500 are pointing upwards and the rear face is pointing downwards.

Figure 4:
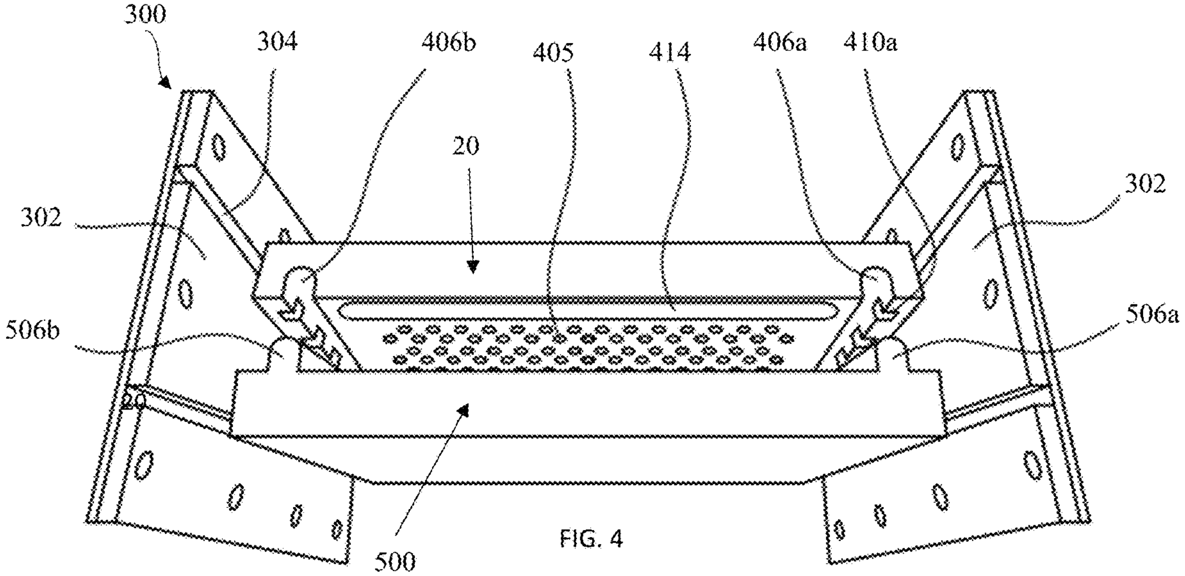
FIG. 4 shows a top perspective view of a mould-separation portion of the apparatus according to the present invention with a two-part mould in a partially open position.

FIG. 4 shows mould-separation portion 300, which comprises two guiding members 302. Guide members 302 are in a vertical orientation. Each guiding member 302 has two cuboidal shaped grooves 304 running longitudinally down the guiding member 302 at a slight diagonal so that the distance between the two grooves 304 is smaller at the bottom of the guiding member 302 than at the top of guiding member 302. The grooves 304 of each guiding member 302 are arranged to face toward and directly oppose a corresponding groove of the other guiding member 302.

In use, the reorientation conveyor portion 102 is located below mould-separation portion 300 such that the lateral Y axis is parallel with the lateral axis of the mould-separation portion 300 and the pivot shaft of the reorientation conveyor portion 102 is arranged proximal to, but slightly offset from, the vertical axis of the mould-separation portion 300 such that upon rotation of the reorientation conveyor portion 102 from the horizontal first orientation to the vertical second orientation, the separation between the first and second retainer members 106*a*, 106*b* is aligned with the bottom end of the mould-separation portion 300 such that mould 20 may pass from the reorientation conveyor portion 102 to the mould-separation portion 300 and the rods 416 of the mould parts 400 and 500 engage with the respective grooves 304 of the guiding member 302.

The apparatus may further comprise an infeed conveyor portion (not shown). The infeed conveyor portion is a 650 mm long rectangular belt conveyor supported at the correct height to align with the reorientation conveyor portion 102 on support legs. The infeed conveyor further comprises plastic side runners to keep the mould laterally aligned.

The apparatus may further comprise an outfeed conveyor portion (not shown). The outfeed conveyor portion comprises a 2500 mm long belt conveyor formed of a high-grip belt and an overhead compression roller. The conveyor and roller are arranged such that the roller is located above the belt conveyor so that a separation is created therebetween. The separation is wide enough to allow the mould to pass between the two conveyors, while the roller applies a pressure to the mould to keep the first and second parts of the mould together during the substantially horizonal movement along the conveyor.

In use, the mould 20 was placed on the infeed conveyor portion. Plastic side runners on the infeed conveyor portion restricted side movement of the mould and kept it straight to feed into the reorientation conveyor portion 102. When the reorientation conveyor portion 102 was ready to accept the mould the mould was driven into the separation in reorientation conveyor portion 102 in the first substantially horizontal orientation. Motors (not shown) were used as the driving force of the conveyor.

The mould 20 was thereby inserted between the first and second retainer members and biasing member 110 allowed the first and second retainer members to maintain force on mould 10. The runners on the reorientation conveyor portion 102 helped to keep the mould aligned within the reorientation conveyor portion 102. Once the mould was in place within the reorientation conveyor portion 102 movement of the mould was stopped and the reorientation conveyor portion 102 was rotated 90 degrees via the actuator into a substantially vertical orientation in which the reorientation conveyor portion 102 was directly underneath the mould-separation portion 300. The mould 20 was then driven upwards, vertically, into the mould separation portion by the first and second retainer member 106 conveyors driving synchronously. The conveyors were powered by a motor (not shown). The force applied by the biasing members maintained the relative positions of the first and second mould parts.

As the mould started to exit the top of the belt conveyors of the reorientation conveyor portion, the mould rods 416 entered grooves 304 at the bottom of the two guiding members 302. The mould was driven up the mould-separation portion 300 by the force applied by the belt conveyors of the reorientation conveyor portion until the mould parts become spaced at the upper end to give an open position in which a reservoir cavity in the space between the mould parts was formed. In this position the dosing retaining members 412 were cooperatively engaged at the lower end of the mould to hold the first and second mould parts 400, 500 in alignment and to allow for a large reservoir cavity to form in which the base reservoir member formed the base of the cavity and all of the mould cavities were open.

With the mould in this position, a moulding composition was dropped into the option portion of the mould from above the mould. The moulding composition was formed as follows. Alumina powder, pore former and dispersant in the amounts given below were mixed to form a powder mixture. An aqueous monomer solution containing a polymerisable monomer, a crosslinking monomer and the water in the amounts given below were added to the powder mixture to form an aqueous slurry. A catalyst and initiator in the amounts given below were then added to the aqueous slurry. The amounts of each component in the resulting slurry were:

| | Amount |
|---|---|
| Alumina powder | 475 |
| Pore former | 60 g |
| Dispersant | 12.25 g |
| Polymerisable monomer | 16.3 g |
| Crosslinking member | 8.2 |
| Catalyst | 3 ml |
| Initiator | 8 ml |
| Water | 135 g |

The resulting aqueous slurry was then cast into the reservoir cavity of mould 20 from a reciprocating feeding nozzle arranged above mould 20 while mould 20 was in the partially open position. The initial reservoir cavity 408 received the moulding composition by dropping the liquid composition from above the spaced front faces of the mould parts into the mouth 454 of the reservoir cavity 408. The composition received was held in cavity 408 and filled the mould cavities 405 that were within the initial reservoir cavity. The mould was held for a short period of time (approximately 2 seconds), for a small reservoir of composition to build-up in the two parts of the mould. The mould was then slowly lowered back into the reorientation conveyor portion 102 by the conveyor belts of the first and second retainer members 106 moving in the opposite direction along the longitudinal X axis, whilst the dosing member was still dosing the mould. Whilst dosing the mould 20, the dosing member moved laterally above mould 20. Mould 20 was gradually moved from the open position to more closed positions as the dosing continued. Dosing then stopped and the mould was closed with further movement back toward the reorientation conveyor portion.

The force of the conveyor belts of the first and second retainer members 106 moving in the opposite direction along the longitudinal X axis moved mould 20 into the closed position, as shown in FIG. 4, by moving the mould down the guiding member 302 along the grooves 304 to further engage the side reservoir members 406, 506 and inner faces of the mould parts in a graduated manner from the base reservoir member upwards toward the mouth of the reservoir cavity. In the partially closed position, the side reservoir members and inner mould faces were further engaged to move the reservoir cavity further up mould 20 toward the front faces of the mould parts. This action also closed the initial reservoir cavity thereby also closing the filled mould cavities that were arranged within the initial reservoir cavity. The relocated reservoir cavity carried any remaining composition that was not taken up by the initially filled mould cavities. This had the effect of transferring a portion of the liquid ceramic composition higher up the grouping of cavity members to thereby allow for the composition to move from the relocated reservoir cavity 408 into the previously empty open mould cavities that now fell within the relocated reservoir cavity 408. The relocated reservoir cavity was also able to receive additional composition from the dosing member. In a partially closed position, the base of the reservoir cavity was eventually formed by abutment of the inner faces of the mould parts.

The mould parts 400, 500 were then be moved to a closed position by the conveyor belts of the first and second retainer members 106 moving further in the opposite (backwards) direction along the longitudinal X axis, causing the reservoir members 406, and post-dosing retaining members 510 to be fully engaged, thereby closing the reservoir cavity 408 and also closing all of the mould cavities to hold the liquid ceramic composition within the closed mould cavities. Any excess composition was captured in recess 414.

Once the mould had been fully lowered back between the two belt conveyors of the first and second retainer members 106, the mould was stopped and the reorientation conveyor portion 102 was rotated 90 degrees, back into the original substantially horizontal position.

The mould was then driven out of the reorientation conveyor portion 102 and onto the outfeed conveyor portion. This conveyor transferred the mould out of the reorientation conveyor portion 102 and allowed another mould to take its place.

Once the moulding composition had gelled into a plurality of solid green bodies within the closed enlarged mould cavities the green bodies were then demoulded. At this point the green bodies had a rubbery, jelly-like consistency. The green bodies were then left to dry at room temperature for 24 hours. The dried green bodies were then fired to 1450° C., at which point the binder and pore formers were burnt off to leave a plurality of solid, porous, packing members.

The packing members were then dipped in an aqueous solution containing catalytic material $Ni(NO_3)^2$ before drying at 500° C. This catalytic material impregnation step was repeated two more times to produce supported catalysts.

Figure 5:
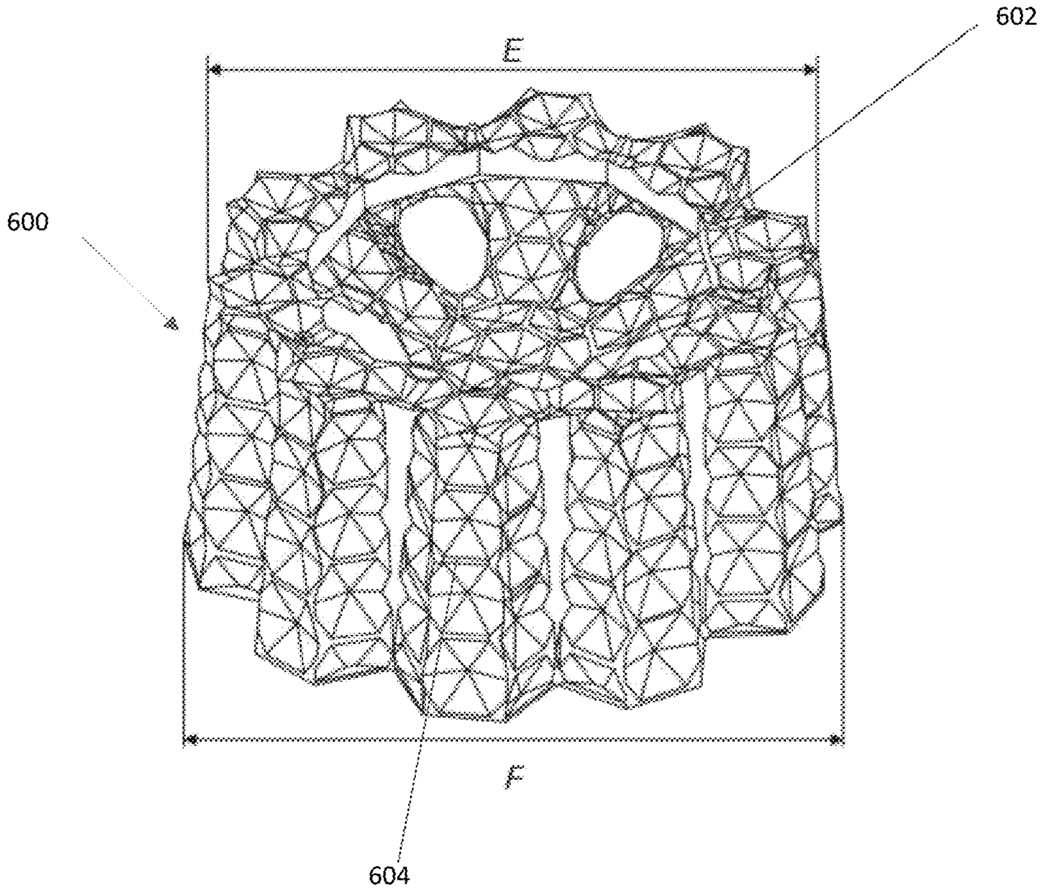
FIG. 5 shows a perspective view of a packing member produced using the apparatus of the present invention.

The supported catalysts produced had a macrostructure and surface structure as shown in supported catalyst 600 of FIG. 5. Supported catalyst 600 had macrostructure in the form of a cylindrical cog shape with a plurality of bores (5 in total) extending through the longitudinal length of the support and a plurality of spaced longitudinally orientated castellations (10 in total) that projected radially outwards from the support. The macrostructure of supported catalyst 600 further had a depression 602 in the upper face of the support 600. Each of the castellations of the cog were tapered in depth such that the supported catalyst 600 had a largest outer width F at the base (38.0 mm) to a smallest outer width E at the upper face of supported catalyst 600 (35.1 mm). Each castellation was further tapered in width, from a widest point at the base of supported catalyst 600 to a narrowest width at the upper face of supported catalyst 600.

Support catalyst 600 had surface structures extending over substantially the whole outer face of the supported catalyst 600. The surface structures were generally in the form of interconnected hexagon-shaped ridges 604.

In this manner, packing members and supported catalysts having improved properties may be manufactured using open vertical filling at the high quantity required in the necessary timespan to achieve a commercially viable production.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus for delivering a mould into a dosing position, comprising:

a mould comprising a first part and a second part;

a reorientation conveyor portion comprising first and second opposed retainer members, wherein at least one of the first and second retainer members comprises a conveyor, and wherein the first and second retainer members are operable to form a separation therebetween, and wherein the reorientation conveyor portion is operable to receive the mould into the separation between the first and second retainer members with the first and second retainer members in a first orientation and then move the first and second retainer members into a second orientation while substantially maintaining the first part of the mould in the same position relative to the second part of the mould; the apparatus further comprising a mould-separation portion, wherein the reorientation conveyor portion is operable to at least partially eject the mould into the mould-separation portion when the first and second retainer members are in the second orientation, and wherein the mould-separation portion is operable to actuate at least partial separation of the first and second parts of the mould.

2. The apparatus according to claim 1, further comprising a biasing member operable to bias the separation between the first and second opposed retainer members to a first distance.

3. The apparatus according to claim 2, wherein the biasing member is operable to apply sufficient force to substantially maintain the first part of the mould in the same position relative to the second part of the mould during movement of the first and second opposed retainer members from the first orientation to the second orientation.

4. The apparatus according to claim 2, wherein the biasing member is sprung-loaded.

5. The apparatus according to claim 1, wherein the apparatus further comprises a dosing member operable to dispense a moulding composition into the mould.

6. The apparatus according to claim 5, wherein the dosing member operable to dispense a liquid ceramic composition, such as a gel-cast composition.

7. The apparatus according to claim 5, wherein the dosing member is operable to move laterally above the mould.

8. The apparatus according to claim 1, wherein the apparatus further comprises an infeed conveyor portion operable to feed the mould into the reorientation conveyor portion.

9. The apparatus according to claim 1, wherein the apparatus further comprises an outfeed conveyor portion operable to receive and move mould ejected from the reorientation conveyor portion.

10. The apparatus according to claim 1, wherein the first and second retainer members of the reorientation conveyor portion comprise a conveyor.

11. The apparatus according to claim 1, wherein the conveyor comprises a belt conveyor.

12. The apparatus according to claim 10, wherein the conveyors of the first and second retainer members are operable to move at the same speed.

13. The apparatus according to claim 1, wherein the conveyors of the reorientation portion, infeed conveyor and/or outfeed conveyor are operable to provide torque in an amount of at least 0.1 Nm.

14. The apparatus according to claim 1, wherein the angle between the first and second orientation of the reorientation conveyor portion is from 30 to 90°.

15. The apparatus according to claim 1, wherein the reorientation conveyor portion comprises a pivot point about which the reorientation conveyor portion is operable to rotate.

16. The apparatus according to claim 1, wherein pivot point is a laterally extending pivot point that is proximal to, but off-set from, the lateral centre line of the reorientation conveyor portion and distal to an end of the reorientation conveyor portion.

17. The apparatus according to claim 1, wherein the reorientation conveyor portion is operable to at least partially eject the mould into the mould-separation portion, when the first and second retainer members are in the second orientation, at a speed of at least 500 mm/min while maintaining the necessary relative alignment of the first and second mould parts.

18. The apparatus according to claim 1, wherein the reorientation conveyor portion is operable to drive at least partial repossession of the partially ejected mould back into the reorientation conveyor portion such that at least partial re-closure of the first and second parts of the mould occurs.

19. The apparatus according to claim 1, wherein the apparatus further comprises a mould comprising a first and a second part.

20. The apparatus according to claim 1, wherein the mould comprises a reservoir forming member, and wherein the mould is operable to be moved from an open position in which the first and second parts are at least partially spaced such that the reservoir member forms a reservoir cavity and the mould cavity is open, to a partially closed position in which the location of the reservoir cavity has moved with respect to the mould cavity and/or the volume of the reservoir cavity has reduced, and then to a closed position in which the first and second parts are engaged such that the mould cavity is closed.

21. The apparatus according to claim 1, wherein the first and/or second mould parts are resiliently deformable.

22. A method of dosing a mould comprising a first and a second part using an apparatus according to claim 1, comprising the steps of:

(a) arranging the mould into the separation between the first and second retainer members with the first and second retainer member in a first orientation;

(b) moving the first and second retainer members into a second orientation while substantially maintaining the first part of the mould in the same position relative to the second part of the mould;

(c) at least partially ejecting the mould into a mould-separation portion so that at least partial separation of the first and second parts of the mould occurs; and (d) dosing the mould with a moulding composition.

23. The method according to claim 22, wherein the method further comprises the step of (e) the first and second retainer members repossessing the mould so that at least partial re-closure of the first and second parts of the mould occurs.

24. The method according to claim 22, wherein the method further comprises the step of (f) moving the first and second retainer members back into the first orientation or into a third orientation while substantially maintaining the first part of the mould in the same position relative to the second part of the mould.

25. The method according to any of claim 22, wherein the method further comprises the step of (g) curing the moulding composition in the mould, such as to form a green body.

26. The method according to claim 22, wherein the apparatus or method is for manufacturing a packing member from a liquid ceramic composition.

27. The method according to claim 26, wherein the apparatus or method is for manufacturing a packing member comprising a ceramic material and further comprising surface structures on the outer surface of the packing member.

28. The method according to claim 22, wherein the apparatus or method is for manufacturing a packing member by gel-casting.

* * * * *